Oct. 30, 1945.   R. S. PULLEN   2,388,011
HANDLING MECHANISM FOR MATCH COMBS AND MATCH COMB PACKETS
Filed Aug. 20, 1941   5 Sheets-Sheet 2

Patented Oct. 30, 1945

2,388,011

UNITED STATES PATENT OFFICE 2,388,011

HANDLING MECHANISM FOR MATCH COMBS AND MATCH COMB PACKETS

Rodney S. Pullen, Akron, Ohio, assignor to Pullenlite Company, Philadelphia, Pa., a corporation of Pennsylvania Application August 20, 1941, Serial No. 407,542

12 Claims. (Cl. 144—51)

My invention relates to mechanism for handling match combs from a hopper, in which the full combs are stored, intermediately, to a conveyor by which the separated book match comb sections are fed to other mechanism.

One of the purposes of the invention is to reverse the direction in which the sticks and heads extend in alternate match combs.

A further purpose is to cut and separate match comb sections spacing them and feeding them to conveyor gripping mechanism.

A further purpose is to flip a match comb from one conveyor position to another while turning it edge for edge.

A further purpose is to divert and separate match comb sections by the act of transferring them in the direction of the match lengths.

A further purpose is to eject match combs in pairs having reversely directed head and stick positions during an interval after a conveyor feed of match combs and during the same interval to flip the upper comb from the position at which the pair rested to the next conveyor position, subsequently feeding separately both match combs at the next conveyor movement.

Further purposes appear in the specification and in the claims.

Figure 2ª is a section upon line 2ª—2ª of Figure 2ᵇ.

Figure 2ᵇ is a section upon line 2ᵇ—2ᵇ of Figure 2ª.

Figure 4ª is a fragmentary top plan view of a part of Figure 4.

Figure 6ª is a fragmentary cross-section showing the plunger of Figure 6.

Figure 6ᵇ is a fragmentary perspective of part of the plunger of Figure 6.

In the drawings similar numerals indicate like parts.

In the making of match packets the well-known match combs are cut into match comb sections, each of which provides the matches for one packet. Initially the matches for a section are attached at their stick ends to stubs and are handled by the stubs.

My present invention is directed to the handling of match combs to cut them up into sections, to separate the sections a distance so that they can be operated upon, and to mount the sections so spaced by supporting the stubs of the sections upon a conveyor chain for handling at other points during the making of the packets. Though I indicate a four packet comb and show mechanism adapted to such a comb it is my intention to deal with, cut separate and mount combs of whatever length, whatever the number of matches involved and whatever the number of packet sections.

For convenience in subsequent handling, the match combs 10 are stored in pairs 11, one pair above another in a hopper 12 each pair including upper and lower combs 13 and 14 pointing in opposite directions, the lower comb 14 of the pair pointing in the correct direction for the mechanism shown, i. e., with the stubs and match sticks at the left and the heads at the right and the upper comb having the head ends toward the left.

The hopper rests at position A above a table 15 upon which the pairs of combs are adapted to be ejected from position A to position B by an operating plunger unit 16 including plunger 17 and operating mechanism (Figure 6) for throwing the plunger back and forward at proper times. From this position B the upper combs 13 of the successive pairs are turned (flipped) a half-turn each about an axis longitudinal with respect to the length of the combs and coincidentally are transferred from position B to position C by a flipper unit 18 (Figures 1 and 6) including flipper 19 and its operating mechanism.

The table is slotted longitudinally throughout most of its working length at 20, 21, 22 and 23 to permit operation in these slots of a plurality of conveyor flights 24, 25, 26 and 27 carrying pusher conveyor blades 28, 29, 30 and 31 and, along with them the cradle conveyor operating mechanism for them (Figures 2, 4 and 5), forming a pusher conveyor unit 32.

At a suitable position to the left of the flipper unit is located a cutting unit 33 comprising cutting knives 34 to cut loose the side sections and knives 35 to cut and thus separate the two sections lying one on one side and the other on the other side of the center, as well as the operating mechanism for these knives.

Figure 3:
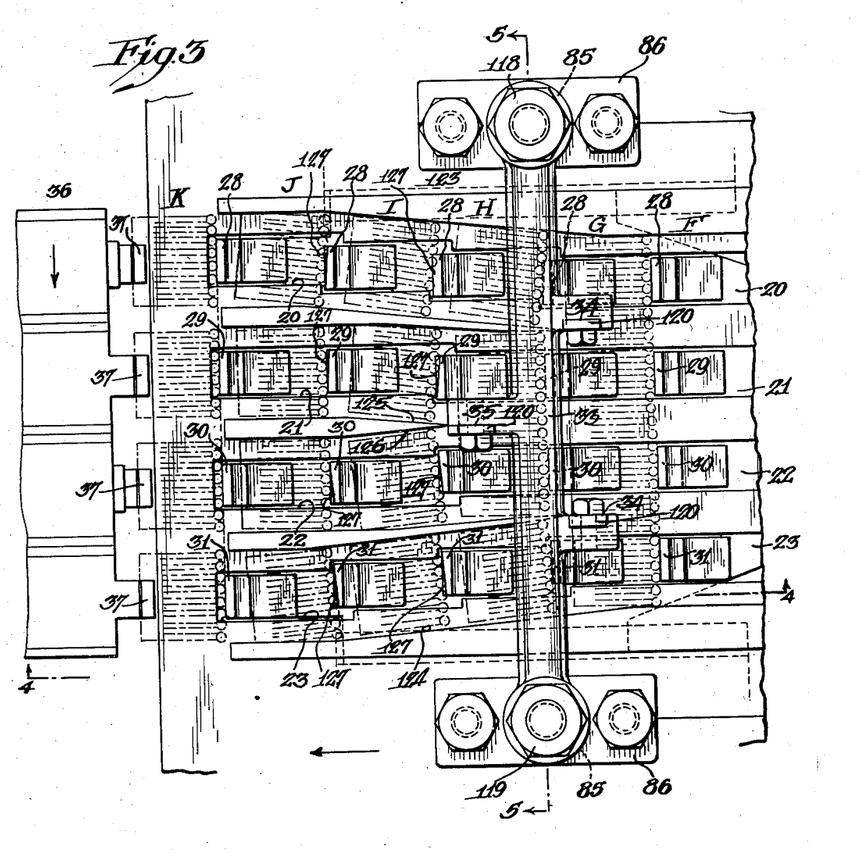
Figure 3 is a fragmentary top plan view of a further portion of the mechanism seen in Figure 1, showing mechanism operating concurrently with the operation of the parts in Figure 1 but upon stock which already has been acted upon by the structure of Figure 1.
Figures 4, 4A:
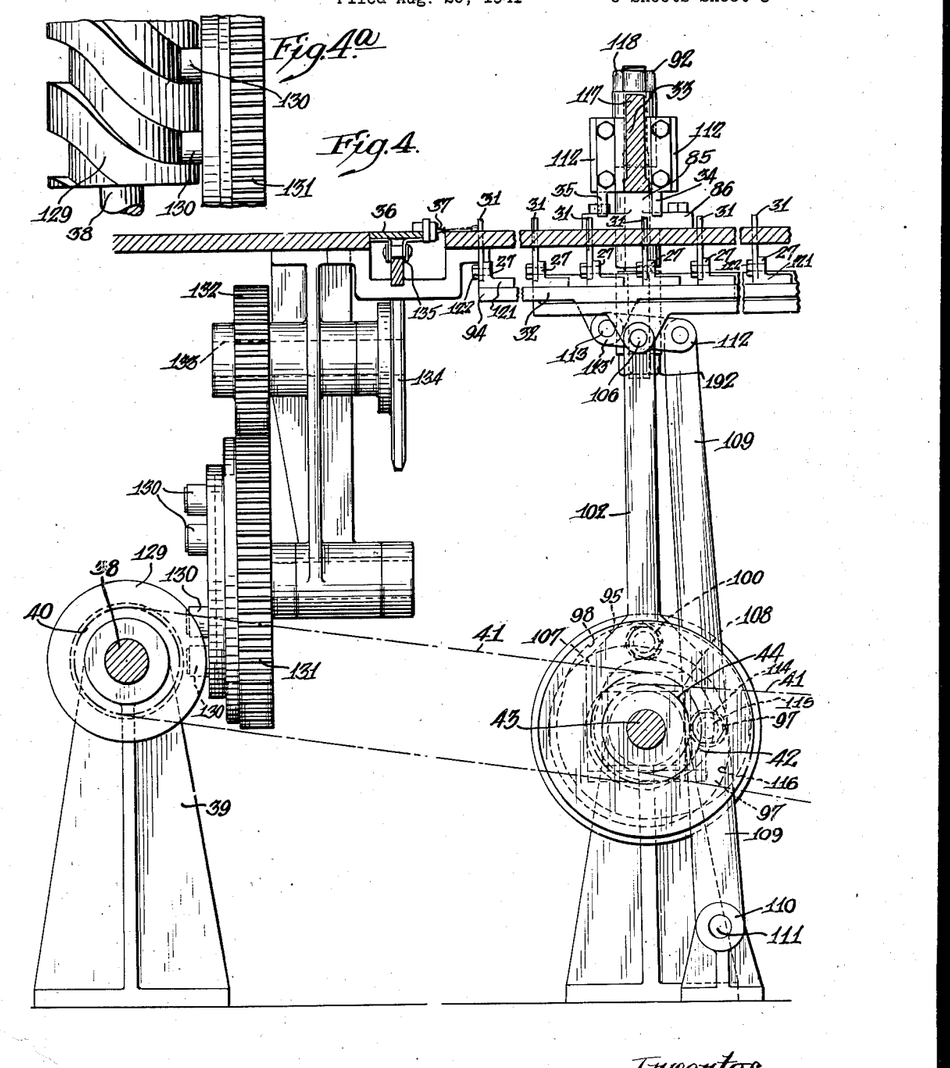
Figure 4 is a vertical section parallel to the direction of match movement showing operating mechanism for cutting the match combs and conveying the match comb sections.

At the left end of Figure 3 and at the left in Figure 4 is shown a match comb section conveyor (here a chain conveyor) supporting and spacing unit 36 presenting successive groups of four line-supported spring clips 37 to receive and carry match comb sections.

Figures 6, 6A, 6B:
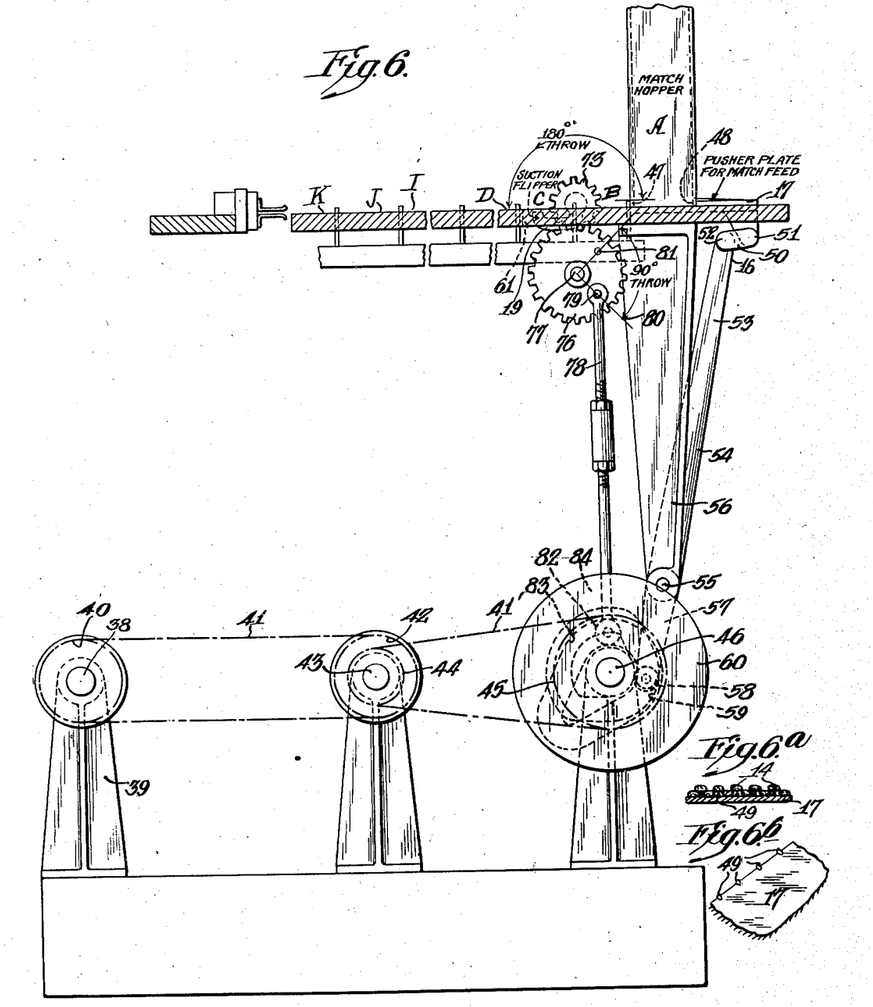
Figure 6 is a diagrammatic view of driving connections for the plunger and flipper operation.

All of the mechanism is illustrated as being driven from a main shaft 38 mounted upon a standard 39 and communicating by pulley 40, Figure 6, and belt 41 with a pulley 42 upon an intermediate or countershaft 43. Upon the countershaft is mounted a pulley 44 connected by belt 41' with a pulley 45 mounted upon a third shaft (second countershaft) 46. Any suitable motor or belt drive (not shown) may be applied to shaft 38.

The plunger 17 is guided within the bed so as to move above the bed through openings 47, 48 in the front and back of the lower part of the hopper 12.

It is quite important that the pusher 17 reliably eject a pair of match combs each time. Since the individual stubs of the matches of the upper comb of the lowermost pair are at the right and are engaged by the pusher and because the stubs are narrower than the lowermost heads of the pair of matches next above, special provision is made to be sure that the stubs are engaged and are pushed to the left with each movement of the pusher. This function is effected by providing prongs 49 at intervals along the upper edge of the pusher, which prongs extend slightly above the plane surfaces of the stubs and fit into the spaces between the lower match heads of the lower comb in the next pair of combs above.

The prongs will slide freely along the under side of the next succeeding comb and as the plunger nears the end of its stroke will be guided under the stub of this comb because the match sticks are still attached to the stub, merge into it, and act as guides for the prongs. The prongs for most of their movement ride in downwardly facing grooves formed by the upwardly pressed sticks and finally follow the joints of the sticks into contact with the stubs.

The law of movement of the plunger with respect to the flights of the step by step conveyor is such that the plunger operates forward and back once only for each two step by step progressions of the conveyor. This relation is secured and is maintained by the relation between the speed of the shaft 43, which is the same as that of the shaft 38 and the slower speed of the shaft 46 by which the plunger is operated. As will be seen by Figure 6, the speed of shaft 46 is reduced by driving the pulley 45 from the pulley 44, the pulley 45 having twice the diameter of the pulley 44.

The plunger is thrown to the left and back again by a link 50, engaging pivotally with the plunger at 51 at one end and at the other end at 52 with the longer end 53 of a lever 54. The lever is pivoted at 55 in a bracket 56 carried by the bed.

The lever extends beyond the pivot 55 at 57 and terminates in a roller 58 which lies within a cam slot 59 opening from the face opposite to the observer in Figure 6 of an internal cam wheel 60 driven by the second countershaft 46.

The relation of the diameters of pulleys 44 and 45 is such that shaft 43 rotates at half the speed of shaft 44 with the result that the plunger operates at every other conveyor stage of movement, after the conveyor starts to move. This is secured by the angular timing of the cam slot and by rotation of the cam wheel 60 but once for each two stages of movement of the conveyor.

The lever extension 57 (the shorter arm of lever 54) is of such proportion and the cam slot is of such throw and circumferential position with respect to the conveyor movements that the plunger operates in the timing with respect to the conveyor indicated herein.

Each match comb is ejected from the hopper from position A to position B coincidently with the movement of the blades of the flight conveyors one stage to the left (which for distinction may be considered the first stage of flight movement). It is necessary that the movement of the pair from the hopper register with the flight conveyor movement because one set of flight conveyor transfer blades would otherwise interfere with the ejection of the pair and a second set of flight conveyor blades follows the ejected pair into position to be ready to transfer the lower comb of the pair to position C in the next (second) conveyor stage movement.

At the same time that the first stage of flight conveyor movement is shifting the flight conveyor blades which had been back of position B to a position where they are back of position C, other flight blades have transferred a comb from position C to position D. This clears position C.

That position C shall be clear at this time is necessary for two reasons; (1) so that the flippers can emerge from their dotted position in Figure 1 to make a clockwise half turn and come back again and (2) returning counterclockwise, so that on the (back) stroke of the flippers there will be an empty position C upon which to rest the comb which is flipped.

The flipper movement must take place during the interval between the first conveyor flight movement and the beginning of the second conveyor flight movement, for the reason that the position C is not vacant for operation of the flipper until after the first conveyor flight movement and the second conveyor flight movement, if it began, would move the comb pair (or the lower one of the combs if the flipper had raised the upper one) from position B so as to interfere with the flipper deposit of the upper one of the combs upon position C.

There are two flippers, one extending into the bed position from one side and the other, its opposite counterpart, from the other side. Except for the differences necessary because of the direction of extension they are identical. For this reason the one nearer to the observer in Figure 1 only will be described.

The flipper normally lies in the position seen in Figure 1 in dotted lines with the nozzle mouth below the surface of the bed and from that position turns in clockwise direction 180° and back again through an opening 61 in the table.

Each flipper includes an oscillatory tube or pipe 62 terminating at one end in an externally threaded flange 62' and a transverse closure plate 62². The latter has an opening 62³ in one half of the plate performing air valve functions. The pipe connects (see Figures 2a and 2b) with a nipple 63 from which hose (seen in Figure 2) extends to a source of vacuum not shown.

The end of the nipple also carries a valve plate 63' having a valve opening 63² in half of the plate. The two openings, 62³ and 63² register in the position of the parts seen in Figure 1 in full lines to apply vacuum and cut off air suction in the position seen at left in dotted lines in Figure 1, partial to full vacuum connection being on at intermediate positions.

A flange 63' upon the outer circumference of the end of the nipple is engaged by an interior flange 64' within nut 64. An internally threaded sleeve 64² on this nut threads upon the externally threaded flange 62' to hold the parts together.

At the opposite end of the oscillatory pipe from the nipple is located an off-center open mouthed flipper nozzle 65. The nozzle is connected with the tube through an elbow 66 and an off-center nearly radial tube section 67.

The pipe 62 is mounted in suitable bearings 68 and 69, preferably using fillers 70 supporting the pipe as the inner bearing members. Longitudinal movement of the suction pipe is prevented in any desirable way such as by the use of a flange 72 upon a filler which engages one of the bearings.

At an intermediate point in the length of the pipe a gear wheel 73 is mounted to rotate with the pipe. It may be carried by the filler and with its hub 74 may be used to limit longitudinal movement of the rotatable suction pipe by engagement with the ends of the bearings. As seen best in Figure 6 the flipper nozzle mouth or opening normally lies a little below the table and oscillates back and forward to a position shown by line 75, representing the height of the pair of match combs which has been ejected.

The valve mechanism by which the suction is connected with the rotary pipe during the counterclockwise movement of the flipper in Figure 6 from the position at which the mouth engages the top comb of each pair until in its counterclockwise movement it deposits this upper comb of the pair at position C is not critical and has not been described because it is considered well within the range of design and capable of operation in any of many different ways. It is not material here whether this is effected by a sleeve valve opening uncovered by the movement of the flipper or by separate valve mechanism, for example, and the character of the valve other than the timing of the valve makes no difference in the operation of the invention.

The gear 73 is turned by an intermeshing gear 76 mounted upon a bearing shaft 77 and rocked by a thrust rod 78 which turns about a pin 79 which it shifts successively through a quadrant stroke from connecting pin position 80 to connecting pin position 81. The reason for making this stroke a quadrant is that the gear 76 is twice the diameter of the gear 73 meshing with it, so that the gear 73 is oscillated through 180° of turning movement for which the mechanism is designed.

The thrust rod 78 carries at its lower end a wheel 82 which fits into a face cam 83 in a cam wheel 84 carried by the shaft 46. This cam wheel 84 rotates of course at the same speed as the cam wheel 60, which is one turn for every two stages of advance of the flight conveyors.

The angular position and extent of the internal cam used to operate thrust rod 78 and the position of this thrust rod must be such that the thrust rod suitably guided will lift and lower to give a complete oscillation of the flipper immediately after the new pair of match combs is ejected, so as to engage the top of the pair with suction in the extreme clockwise position of the flipper and to return the flipper to its normal position, still with suction "on" depositing the upper match comb at position C (releasing the suction) in time for this upper match comb to be transferred from position C to position D at the next (second) stage of movement of the conveyor flights.

Figures 1, 2, 2A, 2B:
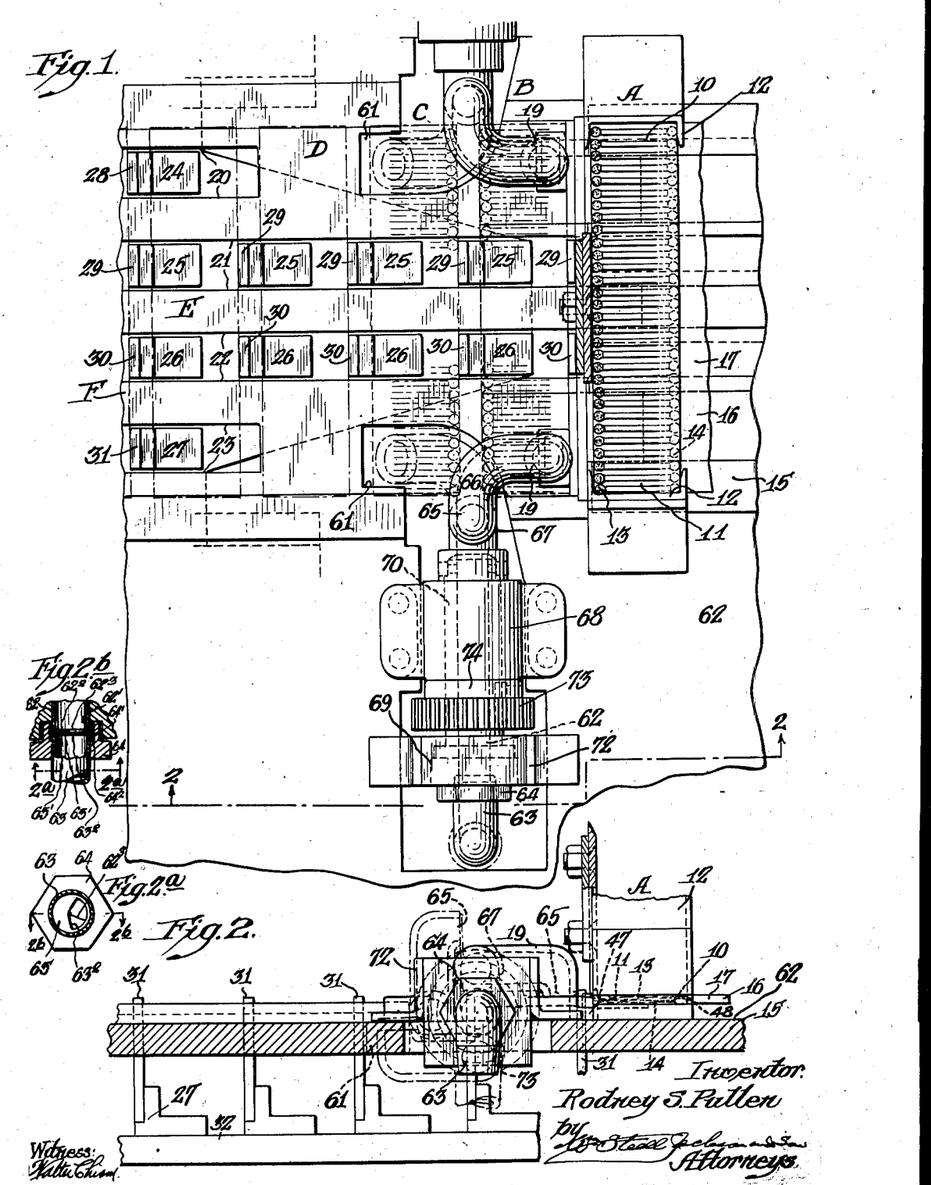
Figure 1 is a top plan view of a hopper containing match combs and of fragmentary mechanism for feeding the combs. Further mechanism is shown in Figure 3.
Figure 2 is a section of Figure 1 taken upon line 2—2 and looking in the direction of the arrow.

Figures 1 and 3 are intended to provide positions and operating mechanism for handling the match combs and the sections cut from them from the hopper to their final delivery between spring clamping clips carried by the links of the chain conveyor.

Figure 1 includes the hopper (position A); the ejecting mechanism delivering to position B: the flipping mechanism turning between positions B and C at which latter the flipped combs are delivered at the end of the return flipper stroke; and positions D and E and a part of position F.

Though the flipping is over at position C and it will be possible to begin cutting at position D, so far as the actual freedom from interference of mechanisms is concerned, non-active positions are provided, such as D, E and F which may vary in number according to the length of space desired, in which there is opportunity for placing combs if any of the combs fail to be fed by the plunger and flipper in the preceding positions. This avoids gaps in comb sections fed to the clips carried by links in the chain conveyor.

The combs which have been fed from the hopper are fed through these relatively idle spaces or positions but no operation is intended to be performed upon them.

In Figure 3 the first position is shown. It is or may be an idler position, such as F, seen in part in Figure 1, but the first action takes place in position G and further operating positions are shown at H, I, J and K.

Since the flight conveyor is used to carry the match combs and, after they have been cut off, the match comb sections, this conveyor will be described next.

There are four conveyor flights, two acting from the hopper to the chain conveyor and two acting from some such position as F to the chain conveyor. Each of the conveyor flights occupies a separate position laterally of the table and moves in a corresponding longitudinal slot separate and distinct from each other conveyor flight and slot, except that they are all operated by one common supporting, lifting and oscillating mechanism. Each moves its blades and the combs or comb sections in front of them through one position length and then returns to move succeeding combs or comb sections through the same position length.

The conveyor flights are nearly identical, differing in that the two flights near the middle of the table are extended farther than the two flights adjacent the respective outer edges of the table. There are three reasons for this. One is that the two flights near the middle of the width of the table are sufficient to handle the match combs until after they are cut, and so are used beginning at position B to advance the lower comb of the pair ejected to the left from position B to position C, to advance the combs at C to D, D to E, E to F and F to G. Another reason is that the positions of the flippers interfere with operation of the outside conveyor flights beyond position F or position E. A third reason is that the cutting of the sections from the combs begins at the outer ends of the comb and these outside conveyor flights have their first separate duty when the first cuts have been made, which in Figure 3 is seen to be at position G.

Another feature in which the four flights are not all alike is that though some pusher blades in each of the flights are laterally offset with respect to other pusher blades in the same flights, pusher blades in the outer flights are farther offset within the total lengths than are the pusher blades for the inner flights because the outer flights must take care of not only their own spacing from the inner flights but the ultimate spacing of some of the pusher blades of the inner flights, one flight from the other.

The mechanism by which the flight conveyors are operated in unison is shown in Figures 1, 3, 4 and 5.

Tubular guides 85 for the conveyor driving mechanism are carried by pedestals 86 on opposite sides of the table. Within the guides 85 move vertically rods 87 rigidly connected with the side bars 88 of a cradle 89, in which bars reduced ends 90, 91 of the rods are held by nuts 92. The side bars carry guides 93 for a blade-supporting plate 94.

Figure 5:
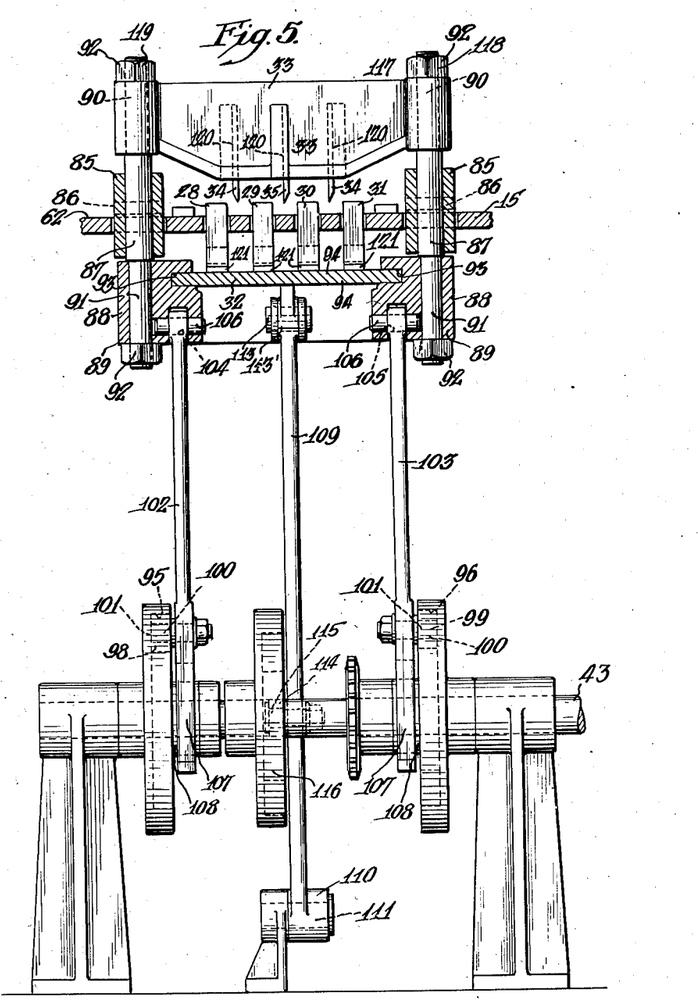
Figure 5 is a section of the mechanism seen in Figure 4 taken upon line 5—5 of Figure 3.

The cradle is lifted and lowered by mechanism best seen in Figures 4 and 5.

Countershaft 43 carries two lifting face cams 95 and 96 and an intermediate face cam 97 by which oscillation of the plate 94 is secured. The lifting face cams have facing cam grooves 98 and 99 which receive rollers 100 secured by pins 101 upon thrust arms 102, 103. The thrust arms connect at their upper end through eyes 104, 105 and pins 106 with the side bars 88. At the lower ends these thrust arms are divided to form yokes at 107. These yokes straddle guides 108 rotatable with the shaft, maintaining the lower ends of the thrust arms against movement transversely of the countershaft. The face cams, rollers and thrust rods thus provide vertical movement of the cradle side bars and of the plate 94 guided by them.

The lever arm 109 is pivoted at its lower end at 110 about a fixed pin 111 and at its upper end terminates in ears 112 which turn about pin 113 in eye 113' rigid with the table. At an intermediate point the lever arm 109 carries roller 114 by pin 115. The roller and its lever are shifted laterally by the walls of a cam groove 116 in a face cam 97 rotatable with the countershaft.

The two face cams 95, 96 with their thrust rods and the face cam 97 with its oscillating arm are timed to produce a composite movement of the plate 94 and of the pusher flight conveyor blades (for all of the flight conveyors) such that the blades travel to the left in Figures 1 and 3 during their match comb and match comb section conveying movement, lower at the extreme left so that the blades drop below the table level, travel to the right in these figures in their inactive return movement, and finally lift at the extreme right so that the blades reach above the table and are in position to carry match combs and match comb sections with them on their next conveying movement to the left. The composite movements of all of the blades of all of the flight conveyors are therefore the same and are timed the same so that when the lower match comb of the ejected pair is being moved from position B to position C, match combs or later match comb sections are being moved by other blades from position C to position D and from position D to position E, etc., throughout the length of the table, the final blades at the left of figures forcing the match combs between spring finger clips attached to and carried by links of the link belt conveyor.

The upper ends of the rods 87 are extended to carry a beam 117 held to them by nuts 118, 119. The beam supports knives 34—34 intended to operate lengthwise of the bed at position G in the drawing in Figure 3, and a knife 35 intended to operate also longitudinally of the bed at position H in Figure 3. These knives are supported from the beam by brackets 120. The knives lift and lower with the conveyor cradle and hence perform their cutting functions at the same time that the flight conveyor blades drop below the surface of the table ready for their return movement to the right in Figures 1 and 3. They therefore cut after the flight conveyor blades have carried match combs or match comb sections to the respective positions G and H and while the combs at position G and comb sections at position H are resting free from movement.

The conveyor blades 28—31 are supported from the plate 94 by brackets 121 to which they are held by means of bolts 122.

The cutting knives have each a length along the length of the bed just sufficient reliably to cut the stubs of the match comb material to separate parts of the comb into comb sections, at position G, to cut off the outer comb sections from the two as yet integral intermediate comb sections which in turn are divided at position H.

In Figure 1 the entire lengths of the table slot portions seen are straight, that is parallel with the length of the table and without offsetting. The two flights 25 and 26 only are extended to engage combs at position B and these flights are the only ones whose blades transfer from position B to position C, from C to D, from D to E and from E to F.

At position F the blades of flights 24 and 27 come into operation, preliminary to the separation of the outside sections of the match combs from the intermediate sections. Until this separation takes place at position G the intermediate flights 25 and 26 are sufficient to handle the match combs. Since the slots for the outside flights are not cut through beyond position E the table can be supported additionally to the right of position F by a generally triangular frame reinforcement 121 which stops at the slots 21 and 22.

The movement of the flight conveyors and the coincident movements of the cutting knives set the timing of the entire mechanism. Though the slots and conveyor blade positions are in line up to position G, where the first cuts take place, from position G on the comb sections are diverted laterally as well as conveyed lengthwise of the table; and the flight conveyor blades contribute to the diversion or separation of these comb sections. This is readily accommodated because the conveyor blades move only the length of one position and then reverse their direction. This affects flights 24 and 27 from G to H and to all of the flights from H to I, from I to J and from J to K.

The diversion beginning at position G after the cuts made at that point is effected by a combination of guides, offsetting and sloping pusher faces. The diagonal guiding members 123 and 124 extend between slots 20 and 21 and between slots 22 and 23 from the left ends of position G to the right ends of position J, respectively beyond which, with the construction shown, they are not needed, and diagonal guide faces 125 and 126, are effective between slots 21 and 22 from the left end of position H to position J.

The transfer blades are offset successively in the outer flights at positions H, I and J with respect to the placing of these parts in position B to G, and in the inner flights they are offset at I only. There is a corresponding offsetting of the slots within which these blades travel.

Since the outside sections only have been severed at position G, from this position to position H these are the only sections which are diverted and the blades which transfer from position G to position H, therefore divert only as to blades 28 and 31 of flights 24 and 27. However at position H, where the cut takes place between the two intermediate match comb sections, these intermediate sections are also diverged and because of their divergence the outer sections must be further diverged to make room for them. For this reason all of the blades 28, 29, 30 and 31 are offset for transfer from position I to position J and the blades 28 and 31 are offset from transfer also from position J to position K.

The diagonal guides 123 and 124 as well as the diagonal guide faces 125 and 126 are assisted in their guiding function by diagonal front faces 127 of the blades 28 and 31 at position G for transfer from position G to position H; and as to all the blades, from position H to I and from position J to position K.

The diversion of the sections separates them to the intended extent during their transfer from position to position until as they rest at position J they are separated each from its adjoining sections by the distance desired in operating upon them subsequently; and with this spacing the final conveyor blades transfer the sections from position J to position K at which their respective stubs are pushed between the springs of clips 128 carried by the successive links of the chain conveyor unit 36.

The construction by which the chain conveyor is advanced is shown at the left in Figure 4. Upon the main shaft 38 is mounted a worm 129 which engages successively with rollers 130 upon a gear 131. The worm and roller spacing ensures that each thread of the worm is always pressing against at least one roller. Gear 131 meshes with a gear 132 upon a common shaft 133 with a sprocket or gear wheel 134 by which chain 135 is driven. This chain conveyor carries spring clips 37, one for each link. The gears 131 and 132 are supported from a bracket 136 and the worm (cam) and gear connection (ratio) is such that the rollers upon gear 131 are advanced one roller for every conveyor feed and are advanced to an extent corresponding with four match section distances measured at position J. In other words four chain conveyor links with their spring clips are advanced at a time and are maintained in position to receive four match comb sections for each feed of the flight conveyors.

The chain conveyor advances the clip-supported match sections, in groups of four to successive positions perpendicular to the paper in Figure 4 and holds them while they are acted upon to apply wraps and covers and thus to form packets. The movements of the chain conveyor take place during times when the flight conveyors are not moving the sections and permissibly while the flight conveyor blades are depressed beneath the table for their idle return movements.

Starting with the hopper filled with pairs of match combs with the table at position B empty and the mouth of the flipper turned to the left in Figure 1 (the dotted position there) the successive operations to and including the delivery of the first group of match comb sections to the link carried supporting clips at the extreme left in Figure 3 are as follows:

While conveyor flights 29 and 30 are moving past empty position B and are carrying match combs from position B to position C, etc., a pair of match combs is ejected from the hopper to position B, the lower comb of the pair being properly placed as regards direction in which the sticks point.

Before the next conveyor feed, the position at C being empty so as to permit the suction transfer nozzle to swing upwardly and over in a right-handed direction in Figure 1, the suction nozzles make their swing and come to rest with their suction openings resting upon the top of the upper match comb. The suction is next applied and the suction nozzles return to the positions which they occupied at first carrying with them the upper match comb of the pair, meantime turning this upper match comb so that its match sticks extend to the left in the figures. All the positions being now filled the conveyor moves each comb section one position to the left, leaving position B again empty so that this part of the operation can be repeated.

At position D or subsequently, G in the showing, the two side sections are cut off and spacing begins. At H the central cut is made and spacing is continued. As soon as the spacing is effected the match sections are pushed into the spring clips. The loaded clips are subsequently moved in a group and their places are taken by empty clips.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a conveying system for match combs, a storage hopper adapted to contain pairs of match combs, having their heads facing oppositely in the pair, a plunger, means for moving the plunger through the bottom of the hopper in the direction of the match length to eject pairs of match combs, one pair of combs at a time, and upwardly projecting prongs on the plunger, higher than the combs ejected and fitting between the matches of the lower comb of the pair above that pair being ejected.

2. In a conveying system for match combs, a storage hopper adapted to contain pairs of match combs having their heads facing oppositely in the pair, the lower comb of the pair having the match heads facing away from the direction of intended movement, a plunger, means for moving the plunger through the bottom of the hopper in the direction of the sticks of the matches in the lower comb of the pair and of the match lengths, to eject pairs of match combs, one pair of combs at a time, the lower part of the plunger engaging the match heads of the lower comb of the pair and the upper part of the plunger engaging the ends of the match sticks of the upper comb of the pair, and upwardly projecting prongs extending above the ends of the match sticks of the upper comb to a height above the sticks and located between the match heads of the lower comb of the pair above that pair which is being ejected.

3. In mechanism for handling match combs, a hopper adapted to contain match combs, a table on which the combs are to be ejected, a plunger movable longitudinally of the table and return and having prongs higher than the lower pair of combs, guides for the plunger, operating means for the plunger comprising a support rigid with the table, a lever pivoted in the support, a cam adapted to engage and oscillate the lever, and a link connected with the lever and with the plunger to reciprocate the plunger, in connection with a step-by-step conveyor for the match combs ejected and driving connections for the conveyor having a two-to-one ratio to the operating means for the plunger whereby the plunger and conveyor are so timed as to reciprocate the plunger once forward and back for each two step-by-step conveyor movements.

4. In mechanism for handling match combs, a hopper adapted to contain match combs, a table on which the combs are to be ejected, a plunger movable longitudinally of the table and return and having prongs higher than the lower pair of combs, guides for the plunger, operating means for the plunger comprising a support rigid with the table, a lever pivoted in the support at an intermediate point, a cam adapted to engage one end of the lever and oscillate the lever, and a link connected with the other end of the lever and with the plunger, in connection with a step-by-step conveyor for the match combs ejected and driving means for the conveyor having a two-to-one ratio to the operating means for the cam whereby the plunger and the conveyor are so timed as to reciprocate the plunger once forward and back for each two step-by-step conveyor movements.

5. In a feeding device for match combs, a hopper having match combs in pairs, the matched combs of each pair being reversely placed, with their match heads pointing in opposite directions, a plunger, means for operating the plunger through the hopper transversely at the bottom to eject a pair of combs at a time, suction flippers in position to engage the top comb of each pair, and means for turning the suction flippers, one at a time, through an arc of a half circle to pick up a comb and turning the flippers back again, to carry the top comb through the said path, to deliver the top comb and at the same time to reverse the direction of pointing of the match heads on one of the combs.

6. In a conveying system for match combs, a storage hopper adapted to contain pairs of match combs having oppositely facing match heads, a plunger movable through the bottom of the hopper to eject pairs of match combs, one pair of combs at a time, oscillatory means engaging the upper comb of the pair, lifting it to separate the combs of the pair, advancing the upper comb ahead of the lower comb and at the same time reversing the match head direction of the upper comb and means for advancing the combs of a pair step by step away from the hopper.

7. In a match comb conveying system, means for delivering match combs in pairs, one comb above the other, upside down and in reversed match direction, suction flippers having nozzles adapted to pick up the upper match comb of a pair when the nozzles point downwardly, means oscillating the flippers so that the nozzles of the flippers are directed upwardly and the match comb carried by them is advanced and reversed in position, a conveyor, a reciprocating means in position to receive both the upper and lower combs of the pair after the flipper has operated and advancing both combs step by step to new positions.

8. In a match comb transfer system, a table, a hopper above the table in position to receive pairs of match combs, a conveyor, means for operating the conveyor step by step to move match combs away from the table, a plunger, means for reciprocating the plunger across the bottom of the conveyor and to feed a pair of match combs from the conveyor, flippers, and means for oscillating the flippers from the position to which the pair of combs is ejected to a position one conveyor step in advance thereof, said means timing the ejector and flippers to operate once for each two step-by-step conveyor movement.

9. In a match comb transfer system, a table, a hopper above the table adapted to receive pairs of match combs, a conveyor, means for operating the conveyor step by step to move match combs away from the hopper, a plunger, means for reciprocating the plunger across the bottom of the hopper to feed match combs from the hopper, a pair at a time, flippers and means for oscillating the flippers from the position to which the pair of combs is ejected to a position one conveyor step in advance thereof, the plunger and flippers being timed to operate once for each two step by step conveyor movements, the plunger, the conveyor and flippers being so timed that the plunger operates while the conveyor is operating and the flippers operate after the plunger operation and before the next conveyor step operation.

10. In a match comb handling system, a hopper adapted to receive match combs, a table, means for delivering a pair of match combs in oppositely directed match head position and one comb above the other upon the table, a suction flipper comprising a suction tube having in one position of the tube a downwardly directed suction nozzle adapted to rest upon and pick up the upper comb of the pair, a gear connected with the nozzle for turning the nozzle about an axis off center with respect to the nozzle, a gear meshing with the first gear, means for oscillating the second gear a distance corresponding to a flipper throw of the nozzle to turn the nozzle through an arc of a circle and bring the upper match comb to a new position, suction connections for the nozzle adapted to apply the suction to the nozzle throughout the range of match comb carrying movement, and means for oscillating the second gear to turn the first gear through the match comb carrying angular movement of the nozzle.

11. In match comb handling machinery, a suction flipper adapted to rotate through an arc from a pick-up point at one position to a delivery point at another position, an oscillatory tube carrying the nozzle, a gear connected with the tube, suction connections for the nozzle adapted to be cut off at the return end of the nozzle stroke, a second gear engaging the first gear, a thrust rod engaging the second gear, a cam, operating connections between the cam and the thrust rod, a reciprocating conveyor system for moving the match combs and means for oscillating the cam one complete oscillation for each two step-by-step movements of the conveyor.

12. The method of handling match combs from a hopper, which consists in arranging the combs in pairs having opposite head directions within the pair, in ejecting a pair of combs at a time, in flipping the upper comb of the pair ahead of the lower comb of the pair in a direction of intended travel and at the same time reversing its head direction to bring it in the same direction as the head direction of the lower comb of the pair, in conveying the upper and lower comb sections through a step-by-step movement whereby the position for deposit of the next pair is free, in moving the two combs of the pair a further step-by-step movement while the next pair of combs is delivered from the hopper, and thus moving the lower comb of the pair from the position to which the upper comb of the second pair is to be flipped, in flipping the upper comb of the second pair to a position in advance of the lower comb of this second pair before the next step-by-step conveying of the combs, in conveying the two combs of the second pair one step as before and continuing the operation.

RODNEY S. PULLEN.